United States Patent
Park et al.

(10) Patent No.: US 9,509,936 B2
(45) Date of Patent: Nov. 29, 2016

(54) APPARATUA AND METHOD OF BROWSING CONTENT

(75) Inventors: Sang-Wook Park, Yongin-si (KR); Jong-Ho Lea, Seongnam-si (KR); Ju-Hwan Lee, Yongin-si (KR); Ji-Hye Chung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1416 days.

(21) Appl. No.: 12/222,796

(22) Filed: Aug. 15, 2008

(65) Prior Publication Data

US 2009/0049477 A1    Feb. 19, 2009

(30) Foreign Application Priority Data

Aug. 16, 2007  (KR) .......................... 10-2007-0082412

(51) Int. Cl.
```
H04N 5/445      (2011.01)
H04N 21/482     (2011.01)
H04N 21/431     (2011.01)
H04N 21/472     (2011.01)
H04N 21/443     (2011.01)
```

(52) U.S. Cl.
CPC ........ *H04N 5/44543* (2013.01); *H04N 21/431* (2013.01); *H04N 21/4312* (2013.01); *H04N 21/4314* (2013.01); *H04N 21/4438* (2013.01); *H04N 21/472* (2013.01); *H04N 21/482* (2013.01); *H04N 21/4821* (2013.01)

(58) Field of Classification Search
CPC ..................... H04N 5/44543; H04N 21/4438; H04N 21/482; H04N 21/431; H04N 21/4821
USPC ......... 725/37–40, 44, 45, 47, 52, 53, 56, 43; 715/200, 212, 214, 764, 781–787, 866, 715/810
See application file for complete search history.

(56) References Cited

U.S. PATENT DOCUMENTS

| | | | | |
|---|---|---|---|---|
| 5,678,015 | A * | 10/1997 | Goh | 715/782 |
| 6,483,548 | B1 * | 11/2002 | Allport | 348/564 |
| 6,754,906 | B1 * | 6/2004 | Finseth et al. | 725/45 |
| 2005/0076361 | A1 | 4/2005 | Choi et al. | |
| 2005/0113812 | A1 * | 5/2005 | Viswanathan et al. | 606/1 |
| 2006/0095543 | A1 * | 5/2006 | Ito et al. | 709/218 |
| 2010/0077434 | A1 * | 3/2010 | Kikinis | 725/44 |

FOREIGN PATENT DOCUMENTS

| | | | |
|---|---|---|---|
| JP | 2001-169197 | 6/2001 | |
| KR | 2001-0101363 | 11/2001 | |
| KR | 10-2004-009262 | 1/2004 | |
| KR | 10-2004-0012297 | 2/2004 | |
| KR | 10-2004-0012297 | * 11/2004 | ............... H04N 5/44 |
| KR | 10-2005-0023704 | 3/2005 | |

\* cited by examiner

*Primary Examiner* — Benjamin R Bruckart
*Assistant Examiner* — Jason Thomas
(74) *Attorney, Agent, or Firm* — Staas & Halsey LLP

(57) ABSTRACT

The present invention relates to an apparatus and method of browsing content and in particular, to an apparatus and method of browsing content that allows a user to easily browse desired content An apparatus for browsing content according to an aspect of the invention includes an apparatus including a metadata storage unit storing information on content, which is classified according to a first classification basis, a second classification basis, and a third classification basis, a browsing-guide-generation unit generating a browsing guide with the first classification basis and the second classification basis as axes, and arranging the generated browsing guide with the third classification basis as an axis, and an output unit outputting the browsing guide.

24 Claims, 14 Drawing Sheets

FIG. 8

| A.M 01:00 | 2007.5.1 | 2007.5.2 | 2007.5.3 | 2007.5.4 |
|---|---|---|---|---|
| CHANNEL 001 | PROGRAM 001-A | PROGRAM 002-A | PROGRAM 003-A | PROGRAM 004-A |
| CHANNEL 002 | PROGRAM 001-B | PROGRAM 002-B | PROGRAM 003-B | PROGRAM 004-B |
| CHANNEL 003 | PROGRAM 001-C | PROGRAM 002-C | PROGRAM 003-C | PROGRAM 004-C |
| CHANNEL 004 | PROGRAM 001-D | PROGRAM 002-D | PROGRAM 003-D | PROGRAM 004-D |

| A.M 01:00 | 2007.5.1 | 2007.5.2 | 2007.5.3 | 2007.5.4 |
|---|---|---|---|---|
| CHANNEL 001 | PROGRAM 001-A | PROGRAM 002-A | PROGRAM 003-A | PROGRAM 004-A |
| CHANNEL 002 | PROGRAM 001-B | PROGRAM 002-B | PROGRAM 003-B | PROGRAM 004-B |
| CHANNEL 003 | PROGRAM 001-C | PROGRAM 002-C | PROGRAM 003-C | PROGRAM 004-C |
| CHANNEL 004 | PROGRAM 001-D | PROGRAM 002-D | PROGRAM 003-D | PROGRAM 004-D |

FIG. 11

| A.M 01:00 | 2007.5.1 | 2007.5.2 | 2007.5.3 | 2007.5.4 |
|---|---|---|---|---|
| CHANNEL 001 | PROGRAM 001-A | PROGRAM 002-A | PROGRAM 003-A | PROGRAM 004-A |
| CHANNEL 002 | PROGRAM 001-B | PROGRAM 002-B | PROGRAM 003-B | PROGRAM 004-B |
| CHANNEL 003 | PROGRAM 001-C | PROGRAM 002-C | PROGRAM 003-C | PROGRAM 004-C |
| CHANNEL 004 | PROGRAM 001-D | PROGRAM 002-D | PROGRAM 003-D | PROGRAM 004-D |

220

APPARATUA AND METHOD OF BROWSING CONTENT

CROSS REFERENCE TO RELATED APPLICATION

This application claims priority from Korean Patent Application No. 10-2007-0082412 filed on Aug. 16, 2007 in the Korean Intellectual Property Office, the disclosure of which is incorporated herein by reference in its entirety.

BACKGROUND OF THE INVENTION

1. Field of the Invention

The present invention relates to an apparatus and method of browsing content, and in particular, to an apparatus and method of browsing content that allows a user to easily browse desired content.

2. Description of the Related Art

Recently, as the number of kinds of broadcasting services, such as satellite broadcasting, HD broadcasting, and cable broadcasting, has increased, and the number of channels that are provided by the individual broadcasting services has increased, information on broadcasting programs as well as channel information is needed.

In addition to broadcasting, since the amount of content, such as moving pictures and images, has also increased, metadata is needed in order to allow a user to browse desired content In the case of broadcasting programs, an electronic program guide that generally uses channel and time axes is provided, such that the user can easily browse for a desired broadcasting program. When the number of channels provided by the individual broadcasting services is small, the user can easily browse for the desired broadcasting program using the electronic program guide. However, when a large number of channels are provided, the electronic program guide cannot show information on all of the broadcasting programs on one screen.

A key operation-driven remote control device has been developed for the case of a small number of channels. At present, although hundreds of channels are provided and an electronic program guide needs to be operated, the remote control device is still used. This leads to an increase in the number of keys on the remote control device, and thus the operation has become complicated.

For example, when a predetermined broadcasting service provides 86 channels, and one program hour, that is, 24 broadcasting programs for a day are programmed, key operations need to be performed 86×24 times from a first program of the first channel to a final program of the final channel.

Therefore, as the number of channels and the amount of content are increased, there is a need for a method that allows a user to easily browse desired content. In addition, if an electronic program guide is provided according to the same axes, an electronic program guide according to a different axis cannot be provided. Therefore, there is also a need for a method that provides electronic program guides according to various axes. That is, since a general electronic program guide is provided according to channel and time axes, the user cannot be provided with electronic program guides according to other axes.

Japanese Unexamined Patent Application Publication No. 2001-169197 discloses a method that three-dimensionally displays an electronic program guide by adding a date axis in a depth direction to a two-dimensional program table composed of a time axis and a station axis. According to this method, however, the electronic program guide is provided according to fixed axes, and there is no suggestion that an electronic program guide is provided while an axis is changed.

SUMMARY OF THE INVENTION

An object of the present invention is to provide an apparatus and method of browsing content that is capable of three-dimensionally providing a browsing guide for content browsing using axes in three directions, and providing browsing guides according to various axes while changing the axes.

Another object of the present invention is to provide an apparatus and method of browsing content that allows a user to use a pointer, which is output on a browsing guide, when he/she selects desired content on the browsing guide, and easily select corresponding content, compared with a case where he/she performs a large number of key operations for content browsing.

The present invention should not be construed as being limited to the above objects, and the above stated objects as well as other objects, features and advantages, of the present invention will become clear to those skilled in the art upon review of the following description.

According to one aspect of the invention, there is provided an apparatus for browsing content, the apparatus including a metadata storage unit storing information on content, which is classified according to a first classification basis, a second classification basis, and a third classification basis, a browsing-guide-generation unit generating a browsing guide with the first classification basis and the second classification basis as axes, and arranging the generated browsing guide with the third classification basis as an axis, and an output unit outputting the browsing guide.

According to another aspect of the invention, there is provided a method of browsing content, the method including storing information on content, which is classified according to a first classification basis, a second classification basis, and a third classification basis, generating a browsing guide with the first classification basis and the second classification basis as axes, and arranging the generated browsing guide with the third classification basis as an axis, and outputting the browsing guide.

BRIEF DESCRIPTION OF THE DRAWINGS

The above and other features and advantages of the invention will become apparent by describing in detail preferred embodiments thereof with reference to the attached drawings in which:

FIG. 8 is a diagram showing a pointer, which is output on a browsing guide, according to an embodiment of the present invention;

FIG. 10 is a diagram showing a browsing guide, on which content having similar characteristics is output, according to an embodiment of the present invention;

FIG. 11 is a diagram showing a pointer, which is output when a browsing guide is scrolled, according to an embodiment of the present invention;

DETAILED DESCRIPTION OF THE PREFERRED EMBODIMENTS

Figure 1:
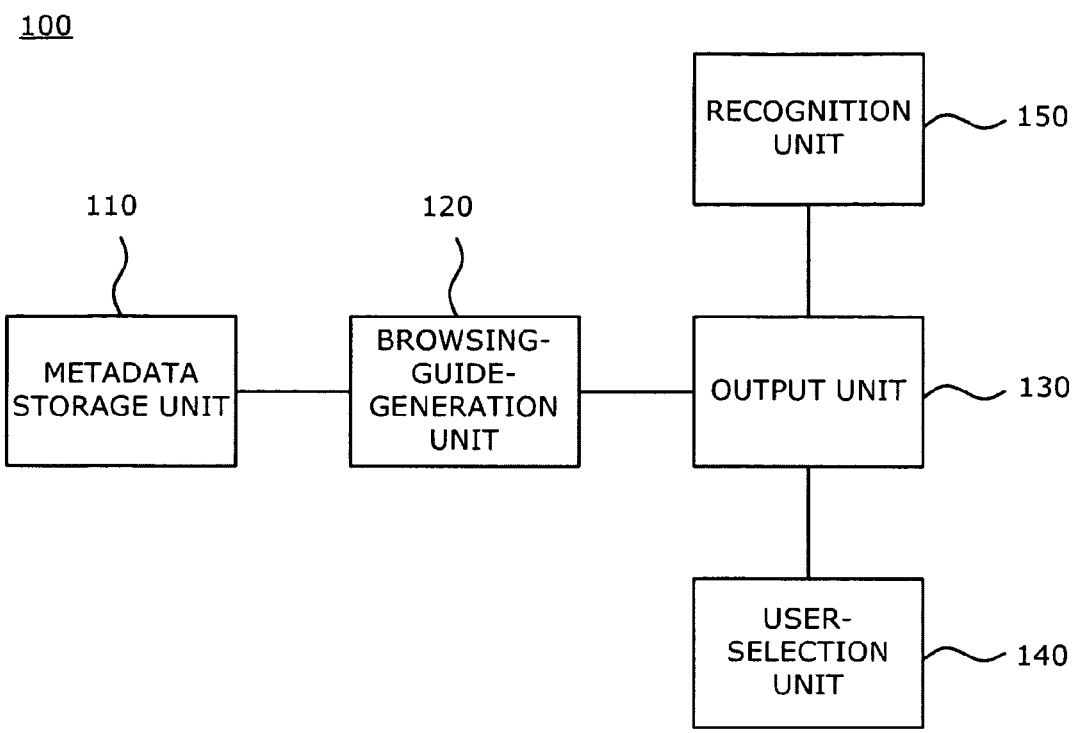
FIG. 1 is a diagram showing an apparatus for browsing content according to an embodiment of the present invention.

Advantages and features of the present invention and methods of accomplishing the same may be understood more readily by reference to the following detailed description of the preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the present invention is described by referring to block diagrams and flow charts which explain the apparatus and the method to prevent data loss of a nonvolatile memory. Here, each block of the flow charts and combinations of the flow charts can be executed using computer program instructions. Since such computer program instructions can be loaded into a personal computer, a customized computer, and other processors of data processing devices which can be programmed, the instructions executed by a computer or a processor of a data processing device which can be programmed can serve as a means to execute the functionality described in the blocks of the flow charts. Such computer program instructions can be loaded into a computer to implement a function in a specific manner. Also such computer program instructions can be loaded on a memory that can be used or read by a computer or a computer that includes a programming data processing device.

The instructions stored in a memory that can be used or read by a computer can be used to produce a manufacturing product including the instructions that executes the functionality described in the flow blocks. Since computer program instructions can be loaded on a computer or other programmable data processing devices, instructions executed in a computer or other programmable data processing device can provide steps to execute functionalities described in the flow blocks.

Also, each block can represent a module, a segment, or a part of code that includes more than one instruction that executes a specific logic functions. Note that in some examples of alternative executions functions mentioned in blocks can be executed out of order. That is, adjacent two blocks can be executed in parallel, or they can be executed in reverse order depending on the functionality of each of the blocks.

FIG. 1 is a diagram showing an apparatus for browsing content according to an embodiment of the present invention.

As shown in FIG. 1, an apparatus 100 for browsing content includes a metadata storage unit 110, a browsing-guide-generation unit 120, an output unit 130, a user-selection unit 140, and a recognition unit 150.

The metadata storage unit 110 stores information on content that is classified according to a first classification basis, a second classification basis, and a third classification basis. Here, the metadata storage unit 110 may store both content and metadata, or only store metadata and receive content corresponding to the stored metadata from an external apparatus, which is connected thereto through a network. However, the present invention is not limited thereto.

In addition, the first classification basis, the second classification basis, and the third classification basis may be changed according to content to be provided to a user. For example, when the content to be provided to the user is broadcasting programs, the first classification basis, the second classification basis, and the third classification basis may be a channel, time, and date, respectively. When the content to be provided to the user is moving pictures, the first classification basis, the second classification basis, and the third classification basis may be a date, category, and popularity, respectively. However, the present invention is not limited thereto, and the first classification basis, the second classification basis, and the third classification basis may vary according to what kind of content is provided to the user.

Further, the first classification basis and the second classification basis become an x-axis and a y-axis on the basis of a screen on which a browsing guide is output, respectively, and the third classification basis becomes a z-axis that is perpendicular to a plane defined by the x-axis and the y-axis. Although the first classification basis and the second classification basis become the x-axis and the y-axis, respectively, and the third classification basis becomes the z-axis in the embodiment of the present invention, this is not intended to limit the present invention, but is an example for a better understanding of the present invention. Two of the first classification basis, the second classification basis, and the third classification basis may become the x-axis and the y-axis, respectively, and the remaining classification basis may become the z-axis.

Figure 2:
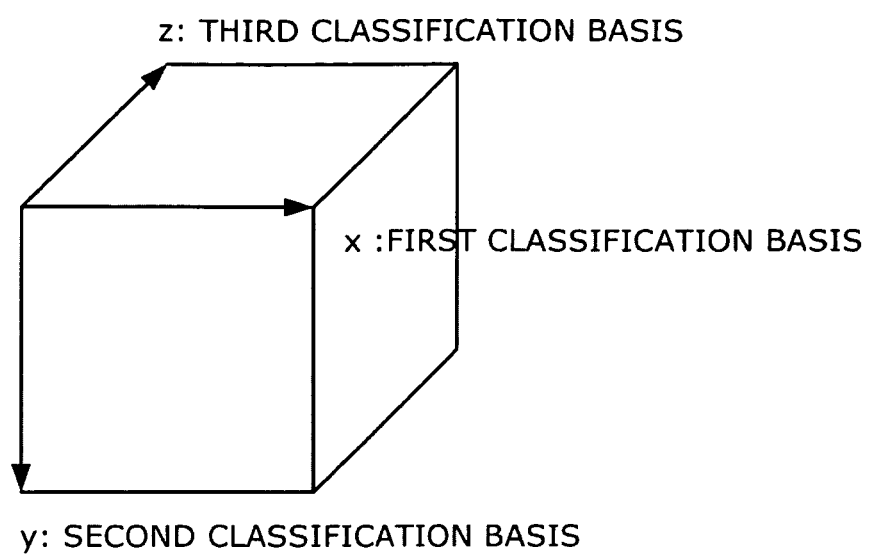
FIG. 2 is a diagram showing axes according to a first classification basis, a second classification basis, and a third classification basis according to an embodiment of the present invention.
Figure 3:
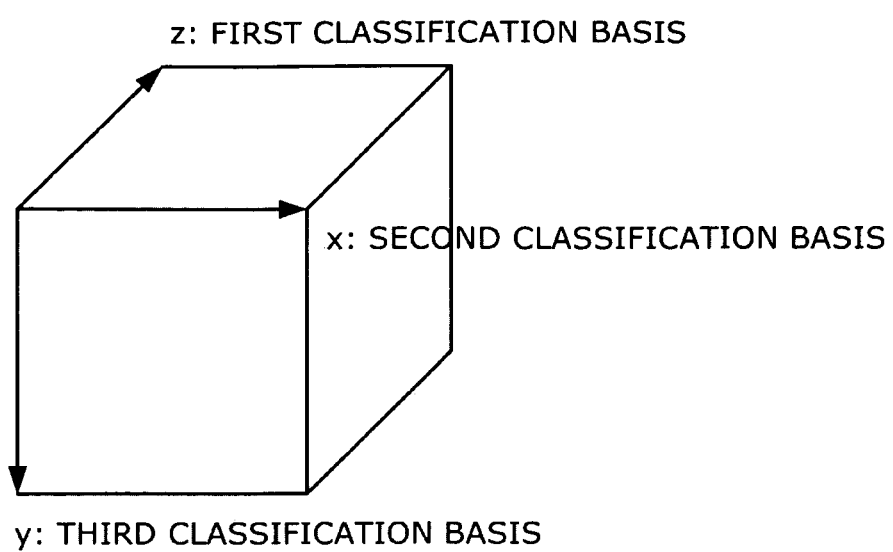
FIGS. 3 and 4 are diagrams showing axes when the classification bases shown in FIG. 2 are changed.
Figure 4:
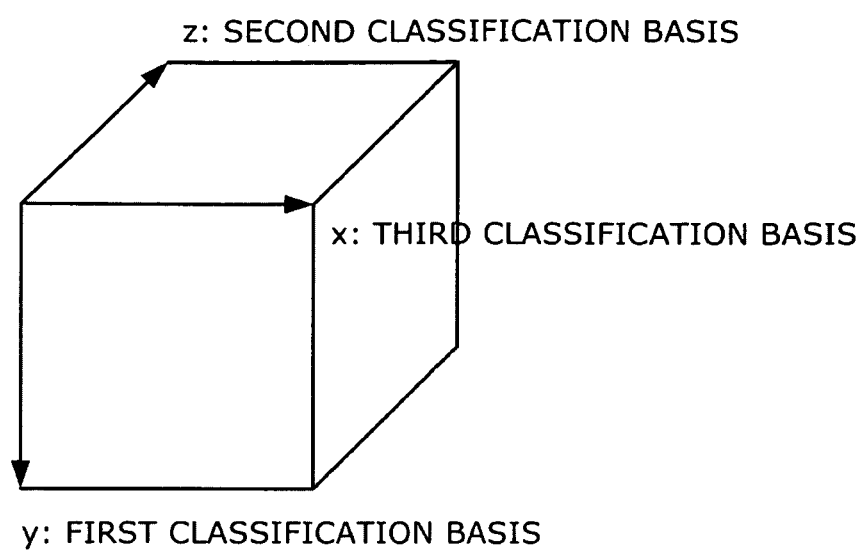

For example, when the first classification basis and the second classification basis become the x-axis and the y-axis, and the third classification basis becomes the z-axis, the classification bases for the individual axes may be determined as shown in FIG. 2. When the axes are changed, as shown in FIGS. 3 and 4, the classification bases for the individual axes may be changed. At this time, FIGS. 3 and 4 are diagrams showing examples where the classification bases for the individual axes shown in FIG. 2 are changed in a counterclockwise direction.

The reason why the classification bases corresponding to the x-axis, the y-axis, and the z-axis can be changed in the above-described manner is that the metadata stored in the metadata storage unit 110 has already been classified according to the first classification basis, the second classification basis, and the third classification basis.

Figure 5:
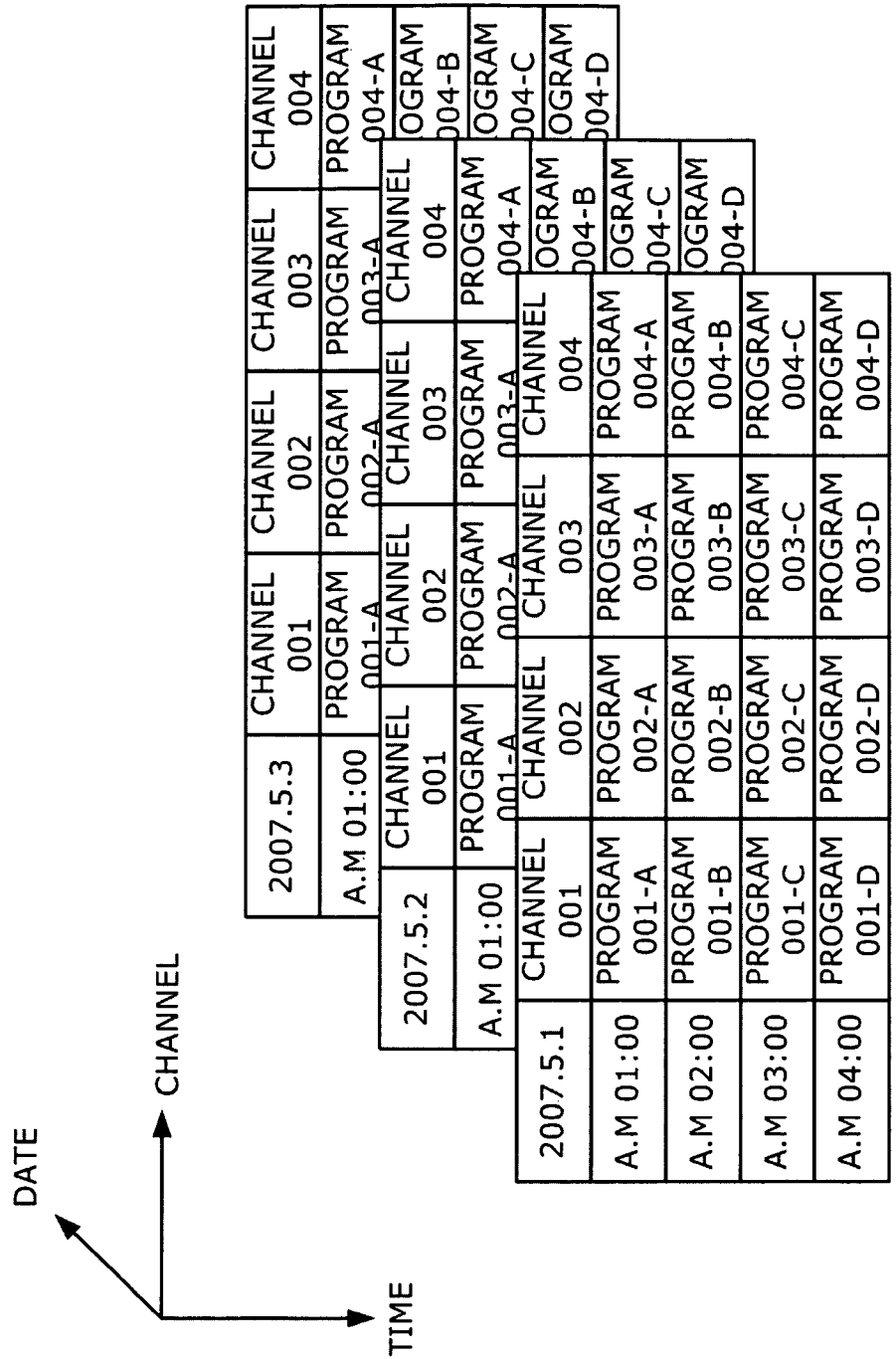
FIGS. 5 to 7 are diagrams showing browsing guides according to an embodiment of the present invention.
Figure 6:
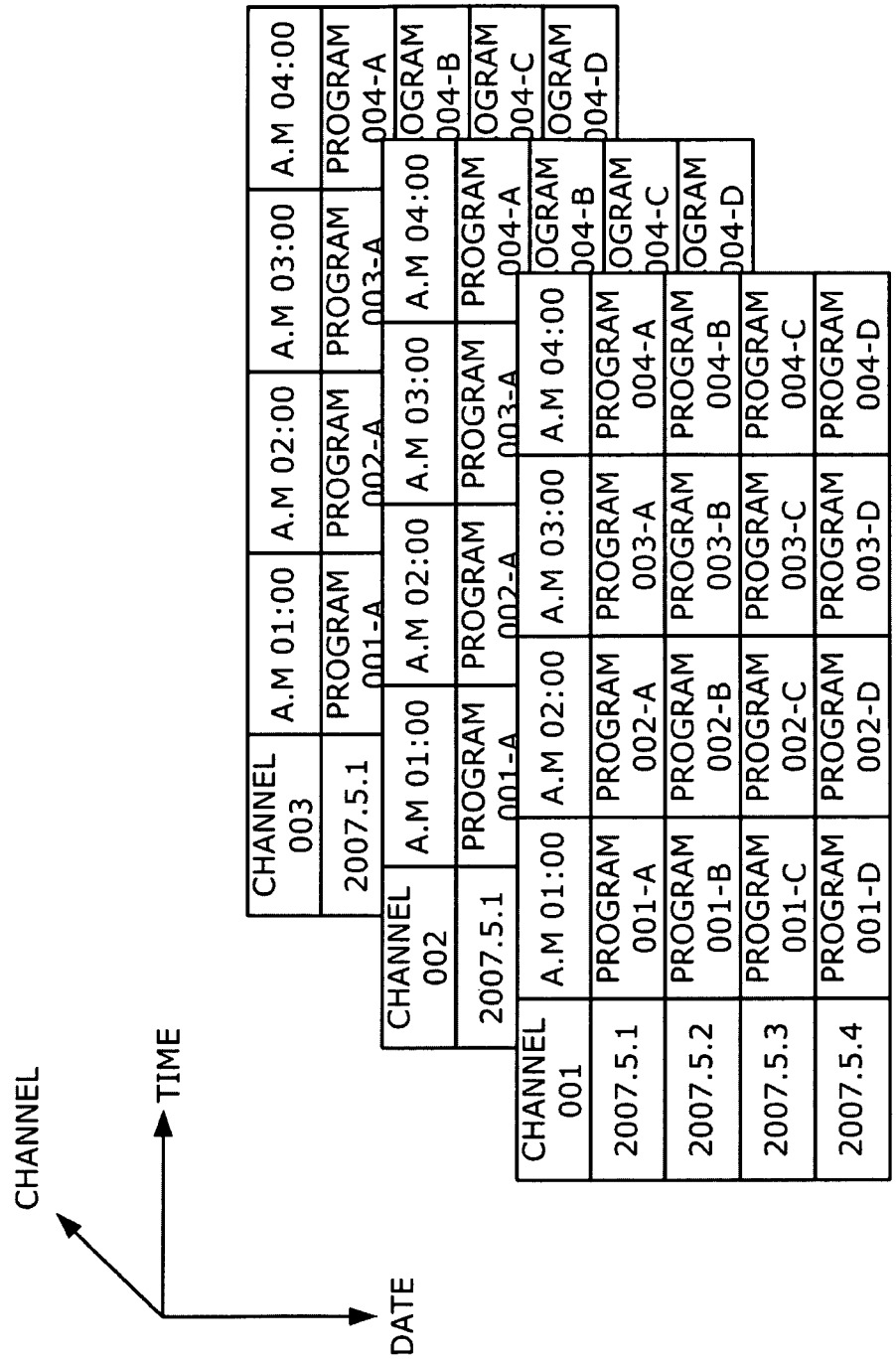
Figure 7:
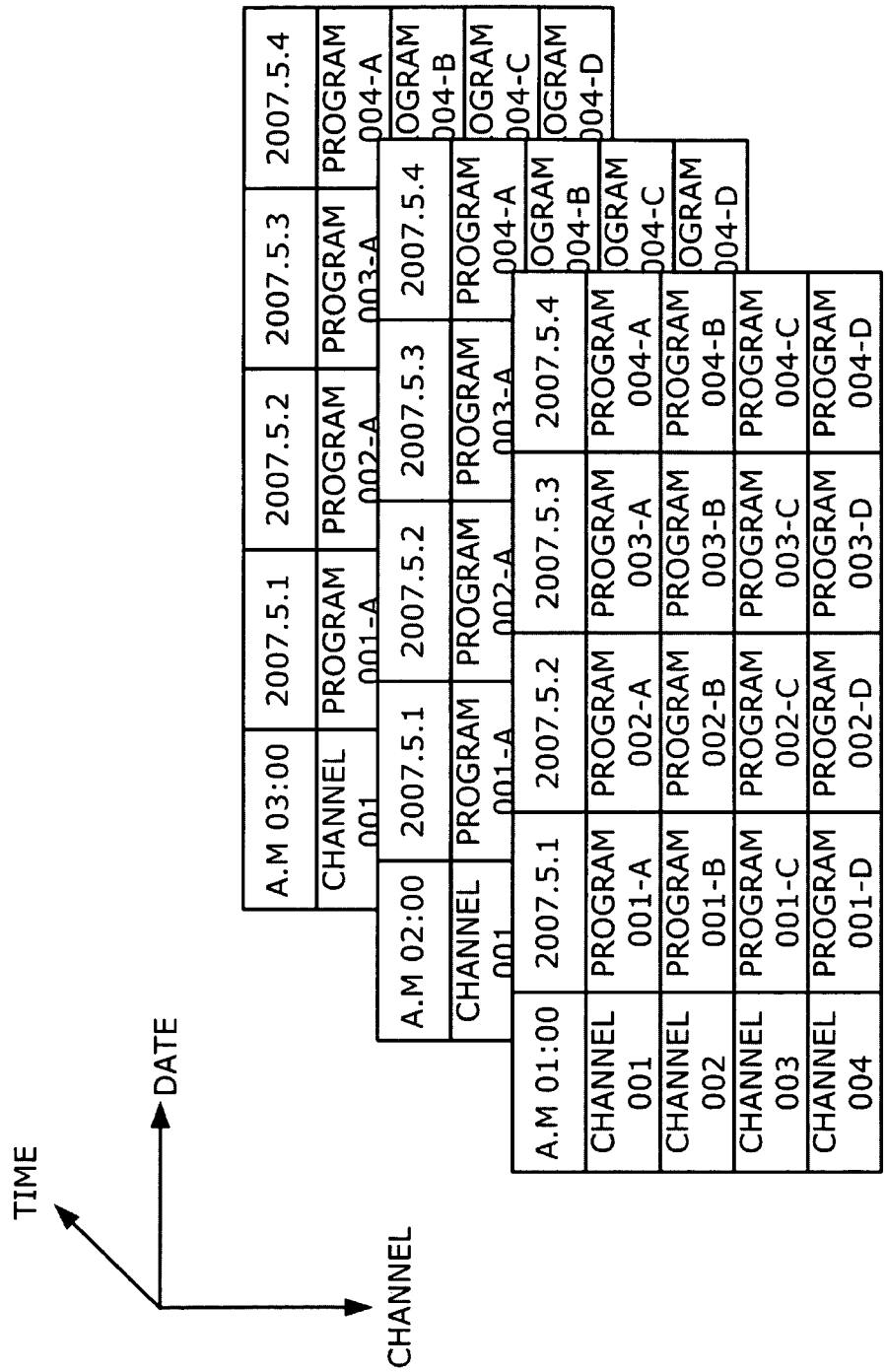

The browsing-guide-generation unit 120 generates a browsing guide with the first classification basis and the second classification basis as axes, and arranges the generated browsing guide with the third classification basis as an axis. Specifically, as shown in FIG. 5, the browsing-guide-generation unit 120 generates a browsing guide with the first classification basis and the second classification basis as the x-axis and the y-axis, respectively, and then arranges the generated browsing guide with the third classification basis as the z-axis. At this time, FIG. 5 is a diagram showing an example where the first classification basis is channel, the second classification basis is time, and the third classification basis is date. Further, FIGS. 6 and 7 are diagrams showing examples where the first classification basis, the second classification basis, and the third classification basis shown in FIG. 5 are changed as shown in FIGS. 3 and 4.

At this time, in order to change the classification bases corresponding to the x-axis, the y-axis, and the z-axis, icons for the first classification basis, the second classification basis, and the third classification basis, which can be selected by the user, may be output on one side of the browsing guide shown in FIG. 5. A classification basis selected by the user may be set as the z-axis. Of course, a case where the classification basis selected by the user is set as the z-axis is, not intended to limit the present invention, but is an example for a better understanding of the present invention. The classification basis selected by the user may become one of the x-axis, the y-axis, and the z-axis, and other classification bases that are not selected may become other axes.

At this time, the browsing guide generated by the browsing-guide-generation unit 120 has cells that are formed by combining the first classification basis and the second classification basis. The metadata may be arranged in the cells.

In respect to browsing guides that are output from the output unit 130, it can be understood that a plurality of browsing guides that are arranged along the above-described z-axis are not output at the same time, but only one browsing guide is output and other browsing guides arranged along the z-axis remain in the background.

As shown in FIG. 8, the user-selection unit 140 allows a pointer 210 to be output on the browsing guide, which is output to the output unit 130, and the user moves the pointer 210 to select a cell, in which desired metadata is arranged.

Figure 9:
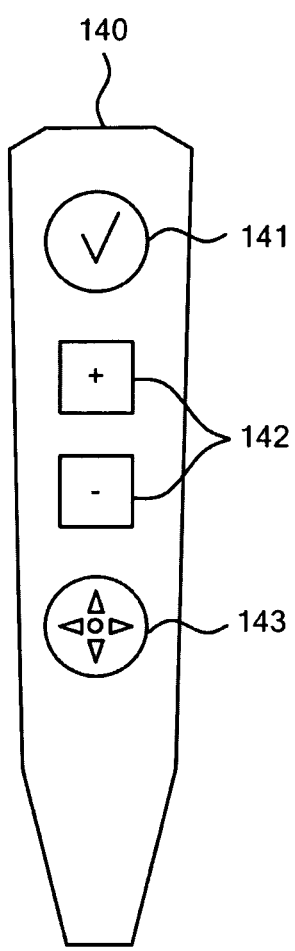
FIG. 9 is a diagram showing a user-selection unit according to an embodiment of the present invention.

As shown in FIG. 9, the user-selection unit 140 includes a first key 141 that is used to select a desired cell on the browsing guide, a second key 142 that is used to change the browsing guide, which is output to the output unit 130, with the third classification basis as the axis, and a third key 143 that is used to browse cells outside a region where the browsing guide is output from the output unit 130. At this time, the second key 142 includes a "+" key and a "−" key. This is just an example where, when the browsing guide is changed according to the third classification basis, the browsing guide is changed in a front and rear direction. This is not intended to limit the present invention, but is an example for a better understanding of the present invention. For example, the second key 142 may include one key and be used together with a joystick to change the browsing guide. At this time, when the z-axis is date, if the user changes a today's browsing guide to a tomorrow's browsing guide, tomorrow's browsing guide visually proceeds from the rear to the front, such that the today's browsing guide is changed to tomorrow's browsing guide. This is not intended to limit the present invention but is an example for a better understanding of the present invention.

The recognition unit 150 recognizes the position of the pointer on the browsing guide. When the user operates the first key 141, the recognition unit 150 highlights a cell where the pointer is located. Therefore, the user sees the selected cell highlighted and easily checks whether the selected cell is a desired cell or not.

At this time, as shown in FIG. 10, the output unit 130 outputs cells, which have characteristics similar to the cell selected by the user, to have a color pattern different from other cells, thereby reflecting a user's preference. Specifically, the output unit 130 may output cells, in which the metadata having characteristics similar to the metadata of the cell selected by the user, such as a genre, an actor or actress, and a kind of content, are arranged, to have a color pattern different from other cells. At this time, FIG. 10 shows a plurality of cells including hatched cells and unhatched cells, which are regarded as different color patterns.

The recognition unit 150 allows the current browsing guide to be changed to a browsing guide before or after the current browsing guide when the user operates the second key 142. That is, the recognition unit 150 changes the browsing guides according to the third classification basis.

As shown in FIG. 11, the recognition unit 150 changes the pointer 210 shown in FIG. 8 when the user operates the third key 143 and outputs a pointer 220 indicating a scroll mode, such that the user is informed that the guide is now in a scroll mode. Then, the user scrolls the browsing guide in a direction, in which the pointer 220 moves, to browse cells outside a region where the browsing guide is output from the output unit 130. Specifically, when the browsing guide has a size larger than the output region of the output unit 130, the user cannot check the entire browsing guide. In this case, the user operates the third key 143 to scroll the browsing guide and browse a desired cell.

Figure 12:
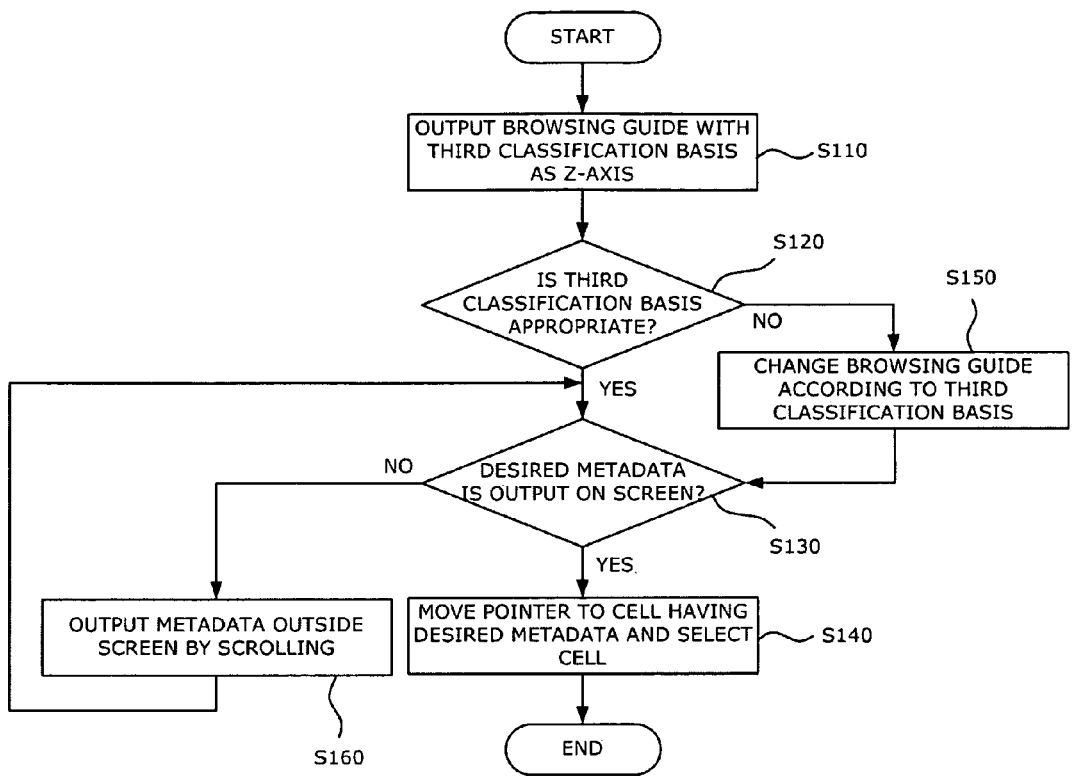
FIG. 12 is a diagram showing a method of browsing content according to an embodiment of the present invention.

FIG. 12 is a diagram showing a method of browsing content according to an embodiment of the present invention. In FIG. 12, a description will be given by way of a case where content are broadcasting programs, and the first classification basis is channel, the second classification basis is time, and the third classification basis is date. In addition, the first classification basis, the second classification basis, and the third classification basis become the x-axis, the y-axis, and the z-axis in that order. Furthermore, it can be understood that FIG. 12 illustrates a method that browses content after the browsing-guide-generation unit 120 generates the browsing guide.

As shown in FIG. 12, according to the method of browsing content according to an embodiment of the present invention, the output unit 130 outputs a browsing guide in which the first classification basis and the second classification basis become the x-axis and the y-axis, respectively S110. At this time, it can be understood that the third classification basis becomes the z-axis, and the x-axis and the y-axis of the output browsing guide represent channel and time, respectively. In addition, the output browsing guide has cells that are formed by combining channel and time, and metadata of corresponding content is arranged in the cells.

The user determines whether the third classification basis in the browsing guide output from the output unit 130 is appropriate S120. That is, when the third classification basis is date, the user determines whether the output browsing guide refers to the relevant date.

At this time, if it is determined that the third classification basis is appropriate, the user determines whether a cell, in which desired metadata is arranged, exists in a region where the browsing guide is output S130.

When the desired metadata exists in the region where the browsing guide is output, the user moves the pointer on the browsing guide to the corresponding cell, and then operates the first key 141 to select the corresponding cell S140. At this time, the output unit 130 highlights the cell selected by the user to inform the user that the corresponding cell is selected.

The output unit 130 outputs cells, in which metadata having characteristics similar to the metadata of the cell selected by the user, to have a color pattern different from other cells. Therefore, the user can select content according to the user's preference.

In Step S120, when the third classification basis is not appropriate, for example, when the date is not a desired date, the user operates the second key to change the browsing guide according to the third classification basis S150. Subsequently, Steps S120 to S140 are performed.

At Step S130, when the cell, in which the desired metadata is arranged, is outside the region where the browsing guide is output, the user operates the third key to scroll the browsing guide S160. Subsequently, Step S140 is performed.

According to the method of browsing content, it is possible to reduce time required to browse the desired metadata when a large number of cells are in the browsing guide.

Figure 13:
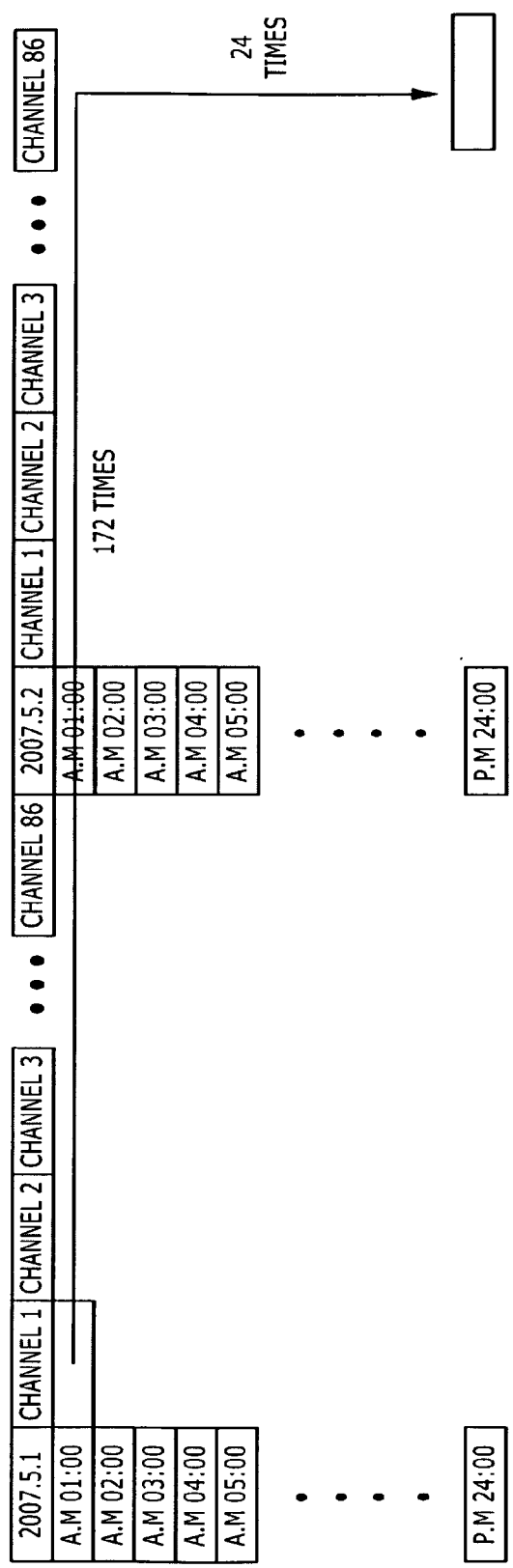
FIG. 13 is a diagram showing the number of key operations on a browsing guide, to which an embodiment of the present invention is not applied.
Figure 14:
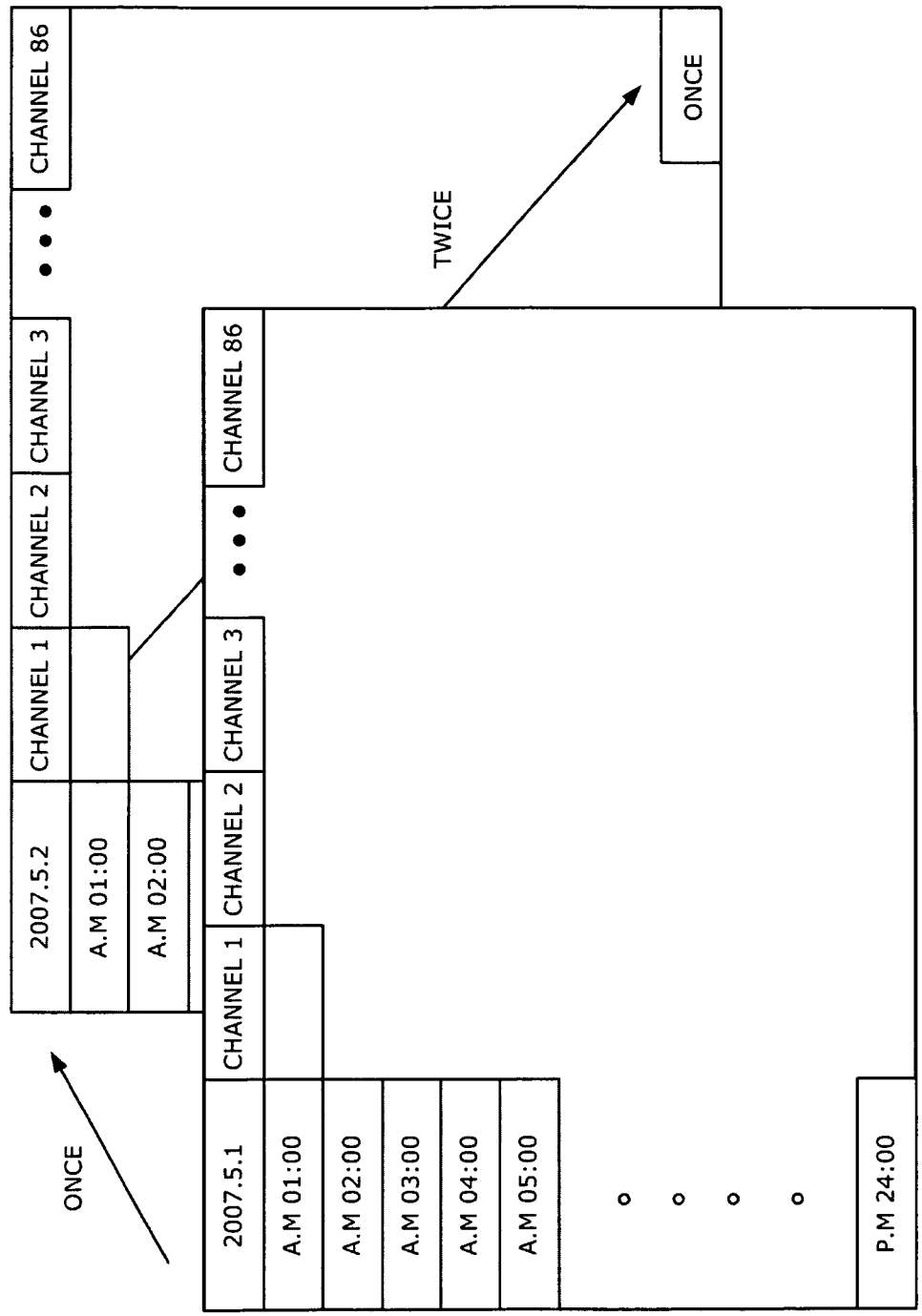
FIG. 14 is a diagram showing the number of key operations on a browsing guide according to an embodiment of the present invention.

For example, when only a broadcasting program for an hour is provided in a channel, that is, when there are 86×24 cells, as shown in FIG. 13, in an existing browsing guide, the user needs to operate a right direction key 172 times and a down direction key 24 times to move from an upper left end of a browsing guide on May 1, 2007 to a lower right end of a browsing guide on May 2, 2007. In contrast, in case of the browsing guide according to the present embodiment of the present invention, as shown in FIG. 14, the user only needs to operate the second key 142 once. In addition, if the user needs to scroll the browsing guide, the user operates the third key 143 twice and the first key 141 once. That is, it is possible to simply move from one browsing guide to another browsing guide by operating the keys four times.

At this time, when the user needs to scroll the browsing guide, the user operates the third key 143 twice. This is because the key operation is performed twice to get into the scroll mode in the user-selection unit 140 and to get out of the scroll mode. However, this is not intended to limit the present invention, but is just an example for a better understanding of the present invention. While the user presses the third key 143 once, if the user moves the pointer, the browsing guide is scrolled in a direction in which the pointer moves. Then, when the user releases the third key 143, the scroll mode is released. Therefore, the third key 143 needs to be operated only once.

The terminology "unit" used in the exemplary embodiments of the present invention represents a hardware component including a Field Programmable Gate Array (FPGA) and an Application Specific Integrated Circuit (ASIC) and executes particular operations. However, the terminology "unit" is not limitative to hardware or software. The unit can be constructed to be stored into addressable storage device or can be constructed to execute one or more processors. For example, the unit can include software components, object oriented software components, class components, and task components. The unit also can include processes, functions, attributes, procedures, subroutines, segments of program codes, drivers, firmware, microcode, circuit, data, database, data structures, tables, arrays, and variables. Functions provided by components and units can be combined into smaller number of components and units or can be further divided into additional components and units.

While the present invention has been particularly shown and described with reference to exemplary embodiments thereof, it will be apparent to those skilled in the art that the scope of the invention is given by the appended claims, rather than the preceding description, and all variations and equivalents which fall within the range of the claims are intended to be embraced therein. Therefore, it should be understood that the above embodiments are not limitative, but illustrative in all aspects.

What is claimed is:

1. An apparatus for browsing content, the apparatus comprising:
   a metadata storage unit storing information on content, wherein the information has at least three classification bases;
   a browsing-guide-generation unit to generate a plurality of browsing guides in respective planes defined by a first classification basis corresponding to a first axis, a second classification basis corresponding to a second axis, and a third classification basis corresponding to a third axis, wherein the plurality of browsing guides are arranged and output along the third axis with a first browsing guide being visible in front of at least one other browsing guide, which itself is partially visible behind the first browsing guide, and wherein each of the first browsing guide and the at least one other browsing guide are selected from among the plurality of browsing guides;
   a user-selection unit to receive a user selection of one of the first classification basis, the second classification basis, and the third classification basis;
   an output unit to output the plurality of browsing guides generated by the browsing-guide-generation unit, wherein when the user selection is received from the user-selection unit, the output unit changes each of the first classification basis, the second classification basis, and the third classification basis to correspond to an axis that is different than a current axis, from among the first, second, and third axes.

2. The apparatus of claim 1, wherein:
   the browsing-guide-generation unit outputs the first classification basis, the second classification basis, and the third classification basis on one side of each of the plurality of browsing guides, and
   the browsing-guide-generation unit generates the browsing guide with the classification bases, excluding a classification basis selected by a user, as axes.

3. The apparatus of claim 1, wherein each of the plurality of browsing guides has cells that are formed by combining the first classification basis and the second classification basis, and the metadata is arranged in the cells.

4. The apparatus of claim 1, wherein:
   the axis of the first classification basis and the axis of the second classification basis are perpendicular to each other, and
   the axis of the third classification basis is perpendicular to a plane, which is defined by the first classification basis and the second classification basis.

5. The apparatus of claim 4, wherein the at least three classification bases are a channel, a time and a date.

6. The apparatus of claim 1, wherein the axis is perpendicular to the plane defined by the first classification basis and the second classification basis.

7. The apparatus of claim 1, wherein the third classification basis is a date.

8. The apparatus of claim 1, wherein the content is a broadcast program, and the information on the content is an electronic program guide (EPG).

9. The apparatus of claim 1, further comprising:
the user-selection unit which receives a user selection to change the plurality of browsing guides;
wherein the output unit outputs a changed browsing guide based on the received user selection.

10. The apparatus of claim 3, further comprising:
the user-selection unit changing a position of a pointer, which is output on the first browsing guide, in order to allow the user to select a cell, in which desired metadata is arranged, among the cells; and
a recognition unit recognizing the position of the pointer.

11. The apparatus of claim 10, wherein the user-selection unit comprises:
a first key used to allow the user to select a desired cell according to the position of the pointer output on the first browsing guide;
a second key used to browse cells outside a region where the first browsing guide is displayed; and
a third key used to change the plurality of browsing guides with the third classification basis as an axis.

12. The apparatus of claim 11, wherein:
the recognition unit changes the shape of the pointer when the user operates the first key, and
the output unit changes an output region of the first browsing guide in a direction in which the pointer moves.

13. The apparatus of claim 11, wherein the output unit displays the cell selected using the first key and cells having characteristics similar to the selected cell to have a color pattern different from other cells.

14. The apparatus of claim 13, wherein the characteristics include at least one of a genre, an actor or actress, and a type of content.

15. A method of browsing content, the method comprising:
storing information on content, wherein the information has at least three classification bases;
generating a plurality of browsing guides in respective planes defined by a first classification basis corresponding to a first axis, a second classification basis corresponding to a second axis, and a third classification basis corresponding to a third axis, wherein the plurality of browsing guides are arranged and output along the third axis with a first browsing guide being visible in front of at least one other browsing guide, which itself is partially visible behind the first browsing guide, and wherein each of the first browsing guide and the at least one other browsing guide are selected from among the plurality of browsing guides;
receiving a user selection of one of the first classification basis, the second classification basis, and the third classification basis;
outputting the plurality of browsing guides wherein when the user selection is received, each of the first classification basis, the second classification basis, and the third classification basis is changed to correspond to an axis that is different than a current axis, from among the first, second, and third axes.

16. The method of claim 15, wherein the generating of the plurality of browsing guides comprises:
outputting the first classification basis, the second classification basis, and the third classification basis on one side of the browsing guide; and
generating the plurality of browsing guides with the classification bases, excluding a classification basis selected by a user, as axes.

17. The method of claim 15, wherein the browsing guide has cells that are formed by combining the first classification basis and the second classification basis, and the metadata is arranged in the cells.

18. The method of claim 15, wherein:
the axis of the first classification basis and the axis of the second classification basis are perpendicular to each other, and
the axis of the third classification basis is perpendicular to a plane, which is defined by the first classification basis and the second classification basis.

19. The method of claim 17, further comprising:
changing a position of a pointer using a device, which outputs the pointer on the plurality of browsing guides, in order to allow the user to select a cell, in which desired metadata is arranged, among the cells; and
recognizing the position of the pointer.

20. The method of claim 19, wherein the device changing the position of the pointer comprises:
a first key used to allow the user to select a desired cell according to the position of the pointer output on the plurality of browsing guides;
a second key used to browse cells outside a region where the plurality of browsing guides are displayed; and
a third key used to change the plurality of browsing guides with the third classification basis as an axis.

21. The method of claim 20, wherein:
the recognizing of the position of the pointer comprises changing the shape of the pointer when the user operates the first key; and
the outputting of the plurality of browsing guides comprises changing an output region of the plurality of browsing guides in a direction in which the pointer moves.

22. The method of claim 20, wherein the outputting of the plurality of browsing guide guides comprises:
displaying the cell selected using the first key and cells having characteristics similar to the selected cell to have a color pattern different from other cells.

23. The method of claim 22, wherein the characteristics include at least one of a genre, an actor or actress, a type of content.

24. An apparatus for browsing content, comprising:
a metadata storage unit to store information on content, wherein the information comprises a first classification basis, a second classification basis, and a third classification basis;
a browsing-guide-generation unit to generate a plurality of browsing guides along a first, second, and third axis based on the stored information having the first classification basis, the second classification basis, and the third classification basis, wherein the plurality of browsing guides are arranged and output along the third axis with a first browsing guide being visible in front of at least one other browsing guide, which itself is partially visible behind the first browsing guide, and wherein each of the first browsing guide and the at least one other browsing guide are selected from among the plurality of browsing guides; and
an output unit to output the browsing guide along with a first icon corresponding to the first classification basis, a second icon corresponding to the second classification basis, and a third icon corresponding to the third classification; and
a user-selection unit to receive a user selection of one icon selected from the first, second, and third icon, which designates the classification basis corresponding to the selected icon to correspond to the first axis,
wherein the output unit outputs the browsing guide with the classification basis designated by the user selection corresponding to the first axis.

\* \* \* \* \*